T. A. WILLARD.
ANIMAL TRAP.
APPLICATION FILED SEPT. 23, 1913.
1,101,368.
Patented June 23, 1914.
2 SHEETS—SHEET 1.
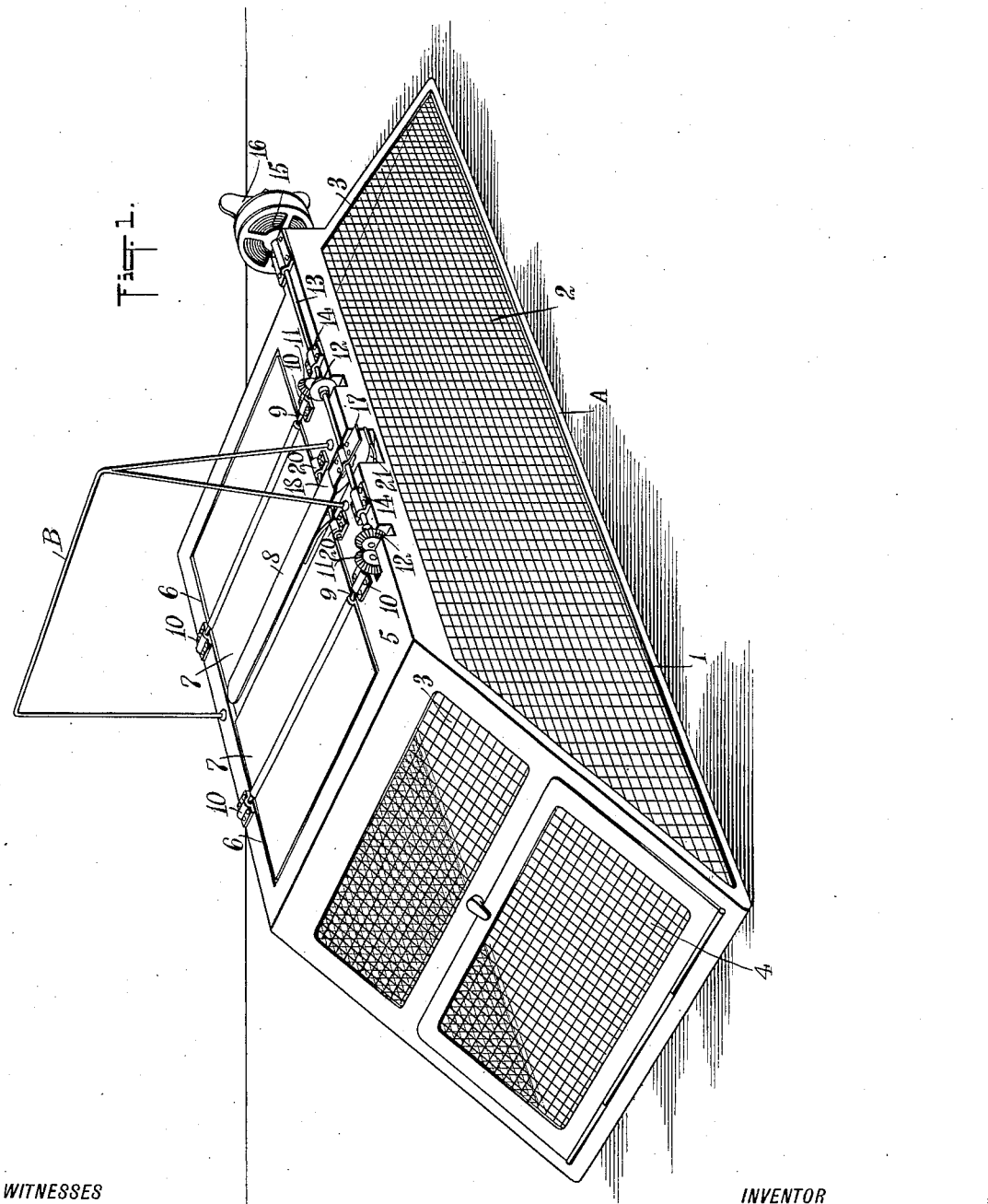
WITNESSES
INVENTOR
Thomas A. Willard
BY
ATTORNEYS T. A. WILLARD.
ANIMAL TRAP.
APPLICATION FILED SEPT. 23, 1913.
1,101,368.
Patented June 23, 1914.
2 SHEETS—SHEET 2.
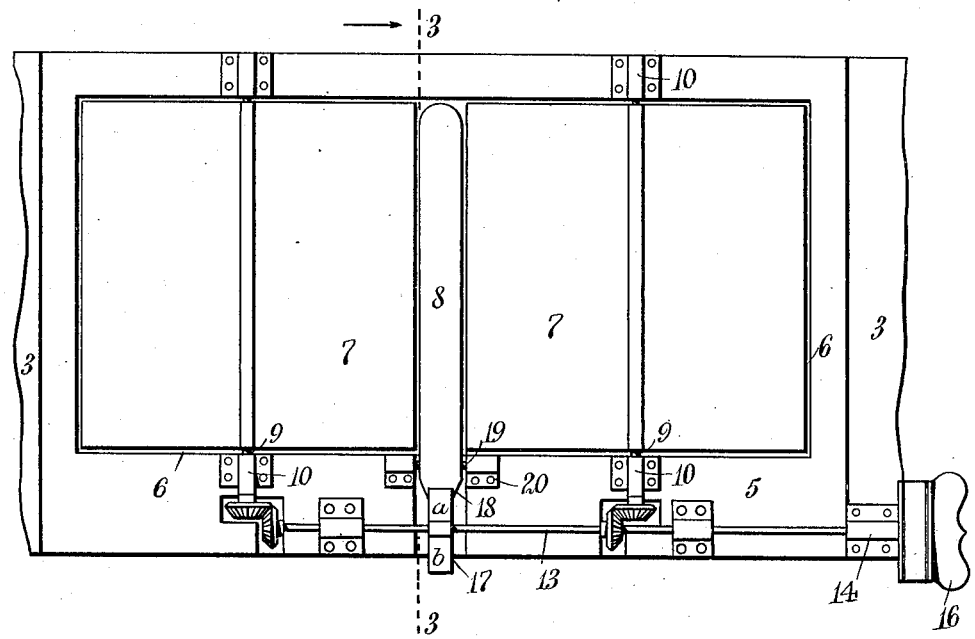
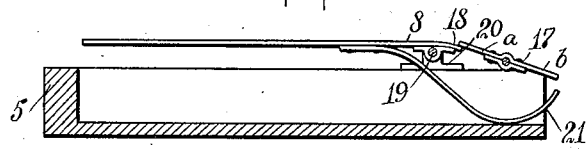
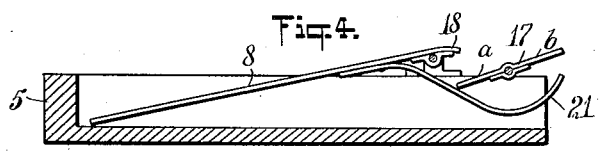
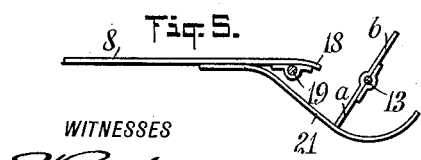
WITNESSES
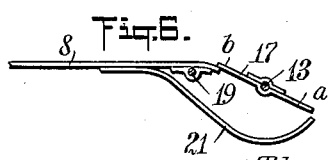
INVENTOR
Thomas A. Willard
BY
ATTORNEYS

UNITED STATES PATENT OFFICE.

THOMAS A. WILLARD, OF ABERDEEN, TEXAS.

ANIMAL-TRAP.

1,101,368.  Specification of Letters Patent.  Patented June 23, 1914.

Application filed September 23, 1913. Serial No. 791,301.

*To all whom it may concern:*

Be it known that I, THOMAS A. WILLARD, a citizen of the United States, and a resident of Aberdeen, in the county of Collingsworth and State of Texas, have invented a new and Improved Animal-Trap, of which the following is a full, clear, and exact description.

This invention relates to an animal trap of that type which is provided at its top with a trap door arrangement whereby a rat or other animal when attempting to eat bait will cause the trap door or doors to release and drop the rat into the cage or trap.

The general objects of the present invention are to improve and simplify the construction and operation of traps of the character referred to so as to be reliable and efficient in use, comparatively inexpensive to manufacture and so designed that a large number of rats can be caught in succession before the trap has to be emptied, as the trap door arrangement is automatic in regard to resetting.

Another object of the invention is the provision of an improved trigger and catch mechanism whereby the operating means for the trap door or doors is actuated to drop a rat into the cage when the trigger is released, such trigger being automatically reset when the trap door or doors are in closed position, so as to be in readiness for entrapping another rat.

With such objects in view, and others as will appear as the description proceeds, the invention comprises various novel features of construction and arrangement of parts as will be set forth with particularity in the following description and claims appended hereto.

In the accompanying drawings, which illustrate one embodiment of the invention, and wherein similar reference characters indicate corresponding parts throughout the several views. Figure 1 is a perspective view of the trap in set position; Fig. 2 is an enlarged plan view of the top portion of the trap showing the trap doors and their actuating and locking means; Fig. 3 is a sectional view on the line 3—3, Fig. 2, showing the trigger, catch and re-setting means, with the trigger in set position; Fig. 4 is a similar view showing the trigger released; and Figs. 5 and 6 are views showing the automatic resetting of the trigger.

Referring to the drawing, A designates the cage or body of the trap which may be of any suitable construction, that shown comprising a bottom 1, wire sides 2 and sloping wire ends 3, there being a door or gate 4 at one of the ends for the removal of the entrapped animal. In the top 5 of the trap is a rectangular opening 6 in each half of which is a trap door 7, such trap doors being spaced apart at the middle of the trap to provide space for a trigger or pan 8 which extends transversely of the cage at the middle thereof from one side to the other. Each trap door is provided with a central shaft 9 which projects from the ends thereof and is journaled in bearings 10 on the top 5 of the cage, and on each shaft 9 is a bevel gear 11 which meshes with a bevel gear 12 on an actuating shaft 13. Since there are two trap doors there are of course two bevel gears 12 on the shaft 13, and these gears are so arranged that the trap doors will swing oppositely to each other; that is to say, one will turn on its shaft in a clockwise direction and the other in an anti-clockwise direction, the purpose being that the inner portions of the doors will swing downwardly or inwardly while the outer portions of the doors will swing upwardly or outwardly when a rat or other animal has pressed or released the trigger 8. The shaft 13 is journaled in bearings 14 on the top of the trap and this shaft is adapted to be turned by a spring 15 which can be wound by a handle or equivalent device 16. The spring 15 is of the coil type, and in unwinding it turns the shaft 13. On the shaft 13 is a double winged catch 17 having the wings *a* and *b*, and these wings are adapted successively to engage the heel portion or lug 18 of the trigger 8, as clearly shown in Figs. 1 and 3, such trigger being fulcrumed at its heel portion on a shaft 19 supported by bearings 20. Normally the tension of the spring 15 holds one wing of the catch 17 in engagement with the trigger, whereby the trigger is held set in approximately horizontal position at a point between the trap doors 7. As soon as the trigger is pressed downwardly by an animal stepping thereon in an attempt to eat the bait which is supported on the bait holder B directly over the trigger and fastened to the top of the cage, the trigger will assume the position shown in Fig. 4. The heel portion 18 of the trigger is moved out of engagement with the wing a of the catch so that the shaft 13 is caused to turn by the unwinding of the spring 15, and in turning the gears 12 will cause the trap doors to swing in such a manner as to drop the rat or other animal into the cage.

To automatically reset the trigger the latter is provided with a catch engaged resetting member 21 which is fastened to the under side of the trigger and has a curved portion more or less concentric with the shaft 13. When the trigger drops, as shown in Fig. 4, the catch 17 engages the member 21 as shown in Fig. 5, whereby the trigger is raised to normal position, and by the time the wing a, for instance, passes out of engagement with the member 21, the wing b will engage the portion 18 of the trigger, as shown in Fig. 6, thereby locking the trigger in reset position and preventing the shaft 13 from turning further. In other words, the catch 17 makes a half turn with each operation of the trigger, and the trap doors 7 will turn through 180° each time the trigger is actuated. It will therefore be obvious that the trap will operate as long as there is tension in the spring 15, and consequently a large number of rats can be caught before the spring has to be rewound.

From the foregoing description taken in connection with the accompanying drawings, the advantages of the construction and method of operation will be readily understood by those skilled in the art to which the invention appertains, and while I have described the principal of operation, together with the device which I now consider to be the best embodiment thereof, I desire to have it understood that the device shown is merely illustrative, and that such changes may be made when desired as are within the scope of the appended claims.

Having thus described my invention I claim as new and desire to secure by Letters Patent:

1. A trap comprising a body having an opening, a trap door pivotally mounted over the opening, a bait holder arranged adjacent one edge of the opening, a trigger extending from one end of the door to the other and pivotally mounted adjacent the edge thereof near the bait holder, and a mechanism normally holding the door against movement and released from the door by the depressing of the said trigger.

2. A trap comprising a cage having an opening, a pivoted trap door at the opening, a trigger pivoted on the cage and extending along one edge of the trap door to the other, a shaft operatively connected with the door and tending to turn constantly in one direction, a plurality of members on the shaft, means on the trigger with which the members successively engage for holding the trigger set and preventing turning of the shaft, and a member connected with the trigger and disposed in the path of the members, whereby the latter resets the trigger automatically when the door returns to closed position.

3. A trap comprising a cage, a pair of trap doors at the top thereof, a tread trigger mounted independently of and between the doors and approximately as long as the latter, actuating means tending to simultaneously open the doors, a catch preventing movement of the said means and engaged with the trigger for holding the latter set, a device for holding bait in coöperative relation with the trigger, and means on the trigger arranged to be engaged by the catch for re-setting the trigger after the doors have opened and closed.

4. A trap of the class described comprising a cage, a trap door at the top thereof, means for mounting the door to turn, a spring-operated shaft, a gearing between the shaft and door for turning the same in one direction from closed to open position and again to closed position, a trigger arranged in coöperative relation with the door, a catch on the shaft arranged to engage the trigger for holding the latter set and preventing turning of the shaft while the trigger is set, and means for supporting bait adjacent the trigger.

5. A trap of the class described comprising a cage, a trap door at the top thereof, means for mounting the door to turn, a spring-operated shaft, a gearing between the shaft and door for turning the same in one direction from closed to open position and again to closed position, a trigger arranged in coöperative relation with the door, a catch on the shaft arranged to engage the trigger for holding the latter set and preventing turning of the shaft while the trigger is set, means for supporting bait adjacent the trigger, and a device connected with the trigger and arranged to be engaged by the catch for re-setting the trigger as the door moves closed.

6. A trap comprising a cage, trap doors at the top thereof and each mounted to turn on a central axis, a shaft, a gearing between the shaft and doors for turning the latter simultaneously in opposite directions, a trigger pivotally mounted between the doors, a two-winged catch mounted on the shaft and arranged to engage the trigger, a member connected with the trigger and adapted to be engaged by the catch for resetting the trigger, and means tending to turn the shaft constantly in one direction.

In testimony whereof I have signed my name to this specification in the presence of two subscribing witnesses.

THOMAS A. WILLARD.

Witnesses:
G. M. THOMPSON,
N. E. WILLARD.